United States Patent
Karademir et al.

(10) Patent No.: US 10,795,974 B2
(45) Date of Patent: Oct. 6, 2020

(54) MEMORY ASSIGNMENT FOR GUEST OPERATING SYSTEMS

(71) Applicant: Microsoft Technology Licensing, LLC, Redmond, WA (US)

(72) Inventors: Ahmed Saruhan Karademir, Seattle, WA (US); Sudeep Kumar Ghosh, Kirkland, WA (US); Ankit Srivastava, Seattle, WA (US); Michael Trevor Pashniak, Newcastle, WA (US); Benjamin M. Schultz, Bellevue, WA (US); Balaji Balasubramanyan, Redmond, WA (US); Hari R. Pulapaka, Redmond, WA (US); Tushar Suresh Sugandhi, Redmond, WA (US); Matthew David Kurjanowicz, North Bend, WA (US); Giridhar Viswanathan, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 204 days.

(21) Appl. No.: 15/994,928

(22) Filed: May 31, 2018

(65) Prior Publication Data
US 2019/0370436 A1 Dec. 5, 2019

(51) Int. Cl.
*H04L 29/06* (2006.01)
*G06F 21/10* (2013.01)
(Continued)

(52) U.S. Cl.
CPC ........ *G06F 21/105* (2013.01); *G06F 9/45545* (2013.01); *G06F 9/45558* (2013.01); *G06F 21/12* (2013.01); *G06F 2009/45583* (2013.01)

(58) Field of Classification Search
CPC .................................................... G06F 21/105
See application file for complete search history.

(56) References Cited

U.S. PATENT DOCUMENTS

| 5,659,792 A | * | 8/1997 | Walmsley | ............ | G11B 27/031 715/202 |
| 6,182,231 B1 | * | 1/2001 | Gilgen | ................. | G06F 1/3203 710/59 |

(Continued)

OTHER PUBLICATIONS

"International Search Report and Written Opinion Issued in PCT Application No. PCT/US2019/032543", dated Aug. 14, 2019, 12 Pages.

*Primary Examiner* — Taghi T Arani
*Assistant Examiner* — Lin Chang
(74) *Attorney, Agent, or Firm* — Liang IP, PLLC (57) ABSTRACT

Techniques for memory assignment for guest operating systems are disclosed herein. In one embodiment, a method includes generating a license blob containing data representing a product key copied from a record of license information in the host storage upon receiving a user request to launch an application in the guest operating system. The method also includes storing the generated license blob in a random memory location accessible by the guest operating system. The guest operating system can then query the license blob for permission to launch the application and launching the application in the guest operating system without having a separate product key for the guest operating system.

20 Claims, 7 Drawing Sheets

(51) Int. Cl.
*G06F 9/455* (2018.01)
*G06F 21/12* (2013.01)

(56) References Cited

U.S. PATENT DOCUMENTS

| | | | |
|---|---|---|---|
| 7,296,271 B1* | 11/2007 | Chalmer | G06F 9/461 |
| | | | 718/108 |
| 8,635,696 B1* | 1/2014 | Aziz | H04L 63/1416 |
| | | | 726/23 |
| 9,305,147 B1 | 4/2016 | Azmat et al. | |
| 9,355,246 B1* | 5/2016 | Wan | G06F 21/566 |
| 9,489,516 B1* | 11/2016 | Lu | G06F 21/53 |
| 9,754,103 B1* | 9/2017 | Patel | G06F 21/52 |
| 2002/0073129 A1* | 6/2002 | Wang | G06F 9/4881 |
| | | | 718/102 |
| 2008/0235273 A1* | 9/2008 | Shipilevsky | G06F 3/0481 |
| 2010/0332650 A1* | 12/2010 | Aisen | H04L 43/0852 |
| | | | 709/224 |
| 2012/0060220 A1* | 3/2012 | Kerseboom | G06F 21/566 |
| | | | 726/24 |
| 2012/0265947 A1* | 10/2012 | Colombo | G06F 9/5016 |
| | | | 711/154 |
| 2013/0117849 A1* | 5/2013 | Golshan | G06F 21/566 |
| | | | 726/23 |
| 2014/0122677 A1* | 5/2014 | Hasegawa | G06F 21/105 |
| | | | 709/223 |
| 2014/0250255 A1* | 9/2014 | Gordon | G06F 21/105 |
| | | | 711/102 |
| 2014/0373014 A1 | 12/2014 | Smith et al. | |
| 2014/0380474 A1* | 12/2014 | Paithane | H04L 63/145 |
| | | | 726/23 |
| 2015/0040182 A1* | 2/2015 | Chambers | G06F 21/10 |
| | | | 726/1 |
| 2015/0261576 A1* | 9/2015 | Gong | G06F 9/5016 |
| | | | 711/6 |

* cited by examiner

MEMORY ASSIGNMENT FOR GUEST OPERATING SYSTEMS

BACKGROUND

Containers, virtual machines, or other types of "guest operating systems" or "guests" can provide additional capabilities and flexibility to a host computer and/or a corresponding host computing operating system. Such guests typically run on a host computer that has a host operating system. In some scenarios, a security boundary isolates operations of the host operating system and the guests to limit access to certain resources such as storage on the host computer. In some scenarios, a guest operating system maintains legacy files and configuration, enabling compatibility with old software applications. In some scenarios, when the guest is not running, the guest also has the encapsulation capability to provide various application packaging techniques. These application packaging techniques facilitate distribution, installation, maintenance, configuration, removal, etc. of the applications. Sometimes an entire guest operating system with one or more pre-installed applications is used for packaging. As such, using guests to run various applications and workloads can help improve isolation, improve compatibility, and reduce maintenance costs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Though helpful in maintaining security boundaries, isolation of guests may present certain operating difficulties when license information is needed to launch an application in a virtual machine or container. In many computing systems, licensing operations are run independently in each host or guest operating system. For example, a host operating system can determine whether the applicant is permitted to be launched based on corresponding data of licensing information (e.g., a product key) or other trust attributes accessible to the host operating system. However, when launching the application inside a guest, a virtual machine or container may not have access to the same licensing information due to the isolation between the host and guest operation systems.

To provide a seamless user experience with applications, certain computing systems can provide sharing of license information between a host operating system and guests. As such, a user can launch applications in multiple guests on a single host with just one product key in the host operating system. However, virtual machines and containers typically have built-in flexibility by design. For example, a virtual machine or container can be created, started, paused, resumed, and stopped. A virtual machine or container running an application can thus be paused and corresponding memory content can be copied with a "snapshot", a "clone", or other techniques from one host to another. The copied memory content can then be used to resume or re-launch the application on other hosts even though the other hosts may not have a valid license to launch the application. There is also an increased ability and convenience for guest operating systems to package applications. For example, some container operating systems have reduced startup times, disk footprint, and ease of deployment than previous implementations. These recent developments render the foregoing pause and resume operations much easier and at lower costs. Furthermore, in some implementations, untrusted code is run in a container which can 'steal' licensing information if the untrusted code breaks protections in the container. Thus, the built-in flexibility of virtual machines and containers may present software piracy risks to software developers.

Several embodiments of the disclosed technology can address certain aspects of the foregoing challenge by implementing storing data of license information in a random memory location allocated by a host operating system to a virtual machine or container. In one implementation, data of license information of an application can be stored in a file system only accessible to a host operating system. When a license driver of the host operating system receives a user request from a user (or a script, a computing service, another software application, or other suitable types of entity) to launch an application in a guest, the license driver can generate a block of data or "blob" of license information (referred to as "license blob") based on the stored license information in the host operating system. In certain embodiments, the license blob can have a time-to-live value (e.g., 1 day). Expiration of the time-to-live value can cause the license blob to be deleted from memory. In other embodiments, the license blob may expire over other suitable periods. In other embodiments, the license blob can also contain data representing event based licenses. For example, a license is provided when a given file is open, a hardware component (e.g., a wireless interface card) is disconnected, or when a user is in a given physical location or region.

The license driver can also be configured to determine a random memory location in a range of memory that is allocated to the guest. In one implementation, when instantiating a virtual machine or container, a hypervisor and/or container engine can be configured to allocate a certain amount of virtual memory available at a host to the virtual machine or container. The virtual machine or container can then use the allocated virtual memory as a "physical memory" for the virtual machine to execute suitable processes of the application. In other implementations, the hypervisor and/or container engine can allocate other suitable types of memory to the virtual machine or container.

In one embodiment, the license driver can be configured to determine one or more sub-ranges of memory locations of the virtual memory allocated to the guest that does not currently contain any data yet (referred to as "free virtual memory"). The license driver can then randomly select one or more memory locations from the free virtual memory for holding the license blob. The license driver can also inform an operating system of the guest the random memory location at which the license information is maintained. In other embodiments, the license driver can also be configured to determine one or more ranges of underlying physical memory of the host corresponding to the allocated virtual memory that does not currently contain any data yet (referred to as "free physical memory"). The license driver can then randomly select a memory location from the free physical memory for holding the license blob. Thus, during operation, the operating system of the guest can query the license information at the random memory location and launch the application upon request.

The foregoing random storage of the license blob can reduce or prevent a risk of software piracy when the virtual machine or container is copied from one host to another. For example, when a user pauses a first virtual machine or container on a first host and copies corresponding memory content to a second host to start a second virtual machine or container, the second host would not likely allocate exactly the same virtual or underlying physical memory to the second virtual machine or container. As such, when an operating system of the second virtual machine or container attempts to query the license blob at the random memory location on the first host, the operating system of the second virtual machine would not be able to locate the license blob. Thus, license information can be protected even when the user copies memory content of the first virtual machine or container from the first host to the second host.

In other embodiments, the license blob can be stored in a random memory location that is not within the allocated virtual memory (or underlying physical memory of the host) to the virtual machine or container. For example, the allocated virtual memory is from "FD00 0000 to FDFF FFFF" for the virtual machine or container. The license driver can be configured to store the blob in a memory location that is outside of the allocated virtual memory, such as at "FBFF FFFF." In other examples, the license driver can also be configured to store the blob at a virtual persistent memory or other suitable types of persistent memory, at a removable storage medium (e.g., a USB drive), at a network file server, or a virtual hard drive temporarily mounted by the guest. As such, even when a user copies memory content of the first virtual machine or container from the first host to the second host, the operating system of the second virtual machine or container would not have access to the license blob stored at a memory location that is "out of bound" of the virtual memory allocated to the first virtual machine or container.

Several embodiments of the disclosed technology can thus provide a seamless experience with applications while reducing or even preventing risks of software piracy. By allowing sharing of license information between a host operating system and a guest, a user is not required to have multiple license keys for each operating system. When sharing the license information, the host operating system can store the license blob at a random memory location within or outside of a range of virtual memory (or corresponding underlying physical memory on the host) allocated to the guest. As such, even if memory content of the guest is copied to another host, a guest operating system on the another host may not access the license blob from the original host.

DETAILED DESCRIPTION

Certain embodiments of systems, devices, components, modules, routines, data structures, and processes for memory assignment for guest operating systems on a host computing device are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

As used herein, a "host" generally refers to a computing device configured to implement, for instance, one or more virtual machines, containers, or other suitable virtualized components. For example, a host can include a server having a hypervisor configured to support one or more virtual machines, containers, or other suitable types of virtual components. The one or more virtual machines or containers can be used to launch and execute suitable applications or computer programs to provide corresponding computing services.

Also used herein, a "host operating system" generally refers to an operating system deployed to interact directly with hardware components of a computer device (e.g., a server, a laptop, a phone). A hypervisor (e.g., a hosted hypervisor) can run on top of a host operating system rather than interacting directly with the hardware components of the computing device. The hypervisor can then create, manage, or otherwise support one or more virtual machines (VMs) or containers each having a "guest operating system" or "guest." In certain implementations, a guest operating system may not be the same as a host operating system supporting the guest operating system.

Further used herein, a "virtual memory" generally refers to abstracted storage resources available on a computing device. A host operating system, using a combination of hardware and software, can map memory addresses used by a virtual machine or container ("virtual addresses") into physical addresses in a memory and/or storage (e.g., a hard drive) on the computing device. A virtual memory, as seen by a virtual machine or container, may appear as a contiguous address space or collection of contiguous segments. The host operating system can manage and facilitate operations of virtual address spaces and corresponding assignment of underlying physical memory to the virtual memory. Once assigned, a virtual machine or container may use the assigned virtual memory as if the virtual memory were a physical memory suitable for executing instructions of applications.

Furthermore, a "memory location" as used herein generally refers to a block, segment, page, or other suitable divisions of memory identifiable to software and hardware in a computing device by a memory address or memory address range. In certain implementations, memory addresses can include fixed-length sequences of digits (e.g., in hexadecimal) displayed and manipulated as unsigned integers. For instance, an example memory location can be at an example memory address of "FBFF FFFF." In other implementations, memory addresses can include other suitable types of identifiers.

As used herein, "license information" or "license info" generally refers to digital data representing a license key or software key that permits installation, execution, or other suitable operations related to an application or computer program. In one example, license information can include a software key that includes a series of alphanumerical characters. In other examples, license information can include digital data of hash values or other suitable types of data.

As described in more detail later, license information can be stored on a host computing device to be accessible only by a host operating system. When a user requests operations (e.g., launch) of an application in a guest operating system, the host component system can be configured to share the license information with the guest operating system. As such, a user can launch applications in multiple guests on a single host with just one licensing key in the host operating system.

However guest operating systems, such as virtual machines and containers, typically have built-in flexibility by-design. For example, a virtual machine or container can be created, started, paused, resumed, and stopped. A virtual machine or container can thus be paused and associated memory content can be copied with a "snapshot", a "clone", or other techniques from one host to another. The copied virtual machine or container can then be resumed on the another host even though the another host may not have a valid license to launch the application. Thus, the built-in flexibility of guest operating systems may present software piracy risks to software developers. In accordance with embodiments of the disclosed technology, a host operating system can be configured to reduce or even prevent unauthorized exportation or copying of the shared license information by storing the shared license information at a random memory location in the guest operating system, as described in more detail below with reference to FIGS. 1-5.

Figure 1:
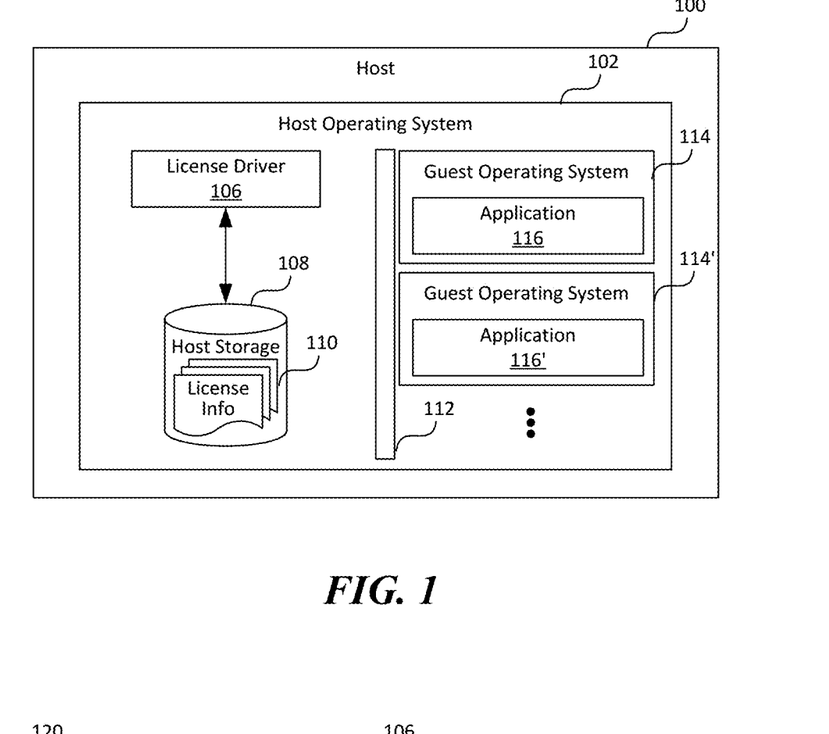
FIG. 1 is a schematic diagram illustrating a host having a license driver configured to facilitate operations of multiple guest operating systems in accordance with embodiments of the disclosed technology.

FIG. 1 is a schematic diagram illustrating a host 100 having a license driver configured to facilitate operations of multiple guest operating systems in accordance with embodiments of the disclosed technology. The host 100 can be a server, a desktop or laptop computer, a smart phone, or other suitable types of computing device. Though only particular components of the host 100 are shown in FIG. 1, in other embodiments, the host 100 can include additional and/or different hardware/software components, such as those example components described below with reference to FIG. 5.

As shown in FIG. 1, the host 100 can include a host operating system 102 having a license driver 106 interconnected to a host storage 108 containing records of license information 110. The host storage 108 can include any suitable computer readable storage device configured to contain digital data. Example host storage 108 can include hardware/software components such as hard disk drives, solid state drives, and associated file systems. In the illustrated embodiment, records of the license information 110 are stored in the host storage 108. In other embodiments, records of the license information 110 can also be stored on a remote server (not shown) or other suitable locations accessible by the license driver 106 via a computer network such as the Internet.

Also shown in FIG. 1, the host operating system 102 can be configured to support one or more guest operating systems 114 individually executing applications 116. In certain embodiments, the host operating system 102 can be configured to provide a hypervisor and/or container engines (not shown) configured to support one or more virtual machines or containers each having a corresponding guest operating system 114. In other embodiments, the host operating system 102 can also include virtual switches (not shown), virtual routers (not shown), or other suitable virtual components configured to facilitate operations of the guest operating systems 114 and/or corresponding applications 116. Two guest operating systems 114 each executing one application 116 are shown in FIG. 1 for illustration purposes. In other embodiments, the host operating system 102 can support three, four, or any other suitable numbers of guest operating systems 114 each executing suitable numbers of applications 116.

As shown in FIG. 1, the guest operating systems 114 are isolated from the host operating system 102 by a security boundary 112. The security boundary 112 can be implemented as a set of rules (not shown) in the host operating system 102 to limit or prevent the guest operating systems 114 and/or the corresponding applications 116 to access certain hardware/software resources in the host operating system 102. For example, as shown in FIG. 1, only the license driver 106 has access to the license information 110 in the host storage 108. The guest operating systems 114 do not have direct access to the license information 110 in the host storage 108. In other embodiments, the security boundary 112 can also limit or prevent the guest operating system 114 from accessing additional compute, storage, network, or other suitable types of resources available to the host operating system 102.

In order to provide a seamless user experience with the applications 116 in the guest operating systems 114, the license driver 106 can be configured to share the license information 110 with the guest operating systems 114. For example, when the license driver 106 receives a request 120 (shown in FIG. 2A) from a user 101 (shown in FIG. 2A) to launch an application 116 in a guest operating system 114, the license driver 106 can generate a block of data or "blob" of license information based on the stored license information 110 in the host storage 108. In certain embodiments, the license blob can have a time-to-live value. Expiration of the time-to-live can cause the blob to be deleted from memory. In other embodiments, the license blob may never expire. In other embodiments, the license blob can also contain data representing event-based license values. For example, a license level is provided when a given file (e.g., a document) is open, when a hardware component (e.g., a wireless interface card) is disconnected, when a user is in a given physical location or region (e.g., an office or secured region), or based on other suitable conditions. The license driver 106 can then provide the generated license blob to the guest operating systems 114 to allow launching or other operations of the applications 116. In certain embodiments, the licensing driver 106 can generate a more restrictive license for use by the application 116 than the host operating system 102, for instance, by limiting functionalities of the application 116 in the guest operating system 114. The license driver 106 can also be configured to limit or prevent unauthorized copying of the shared blob of licensing information by storing the blob at a random memory location of the guest operating systems 114, as described in more detail below with reference to FIGS. 2A-2E.

Figure 2A:
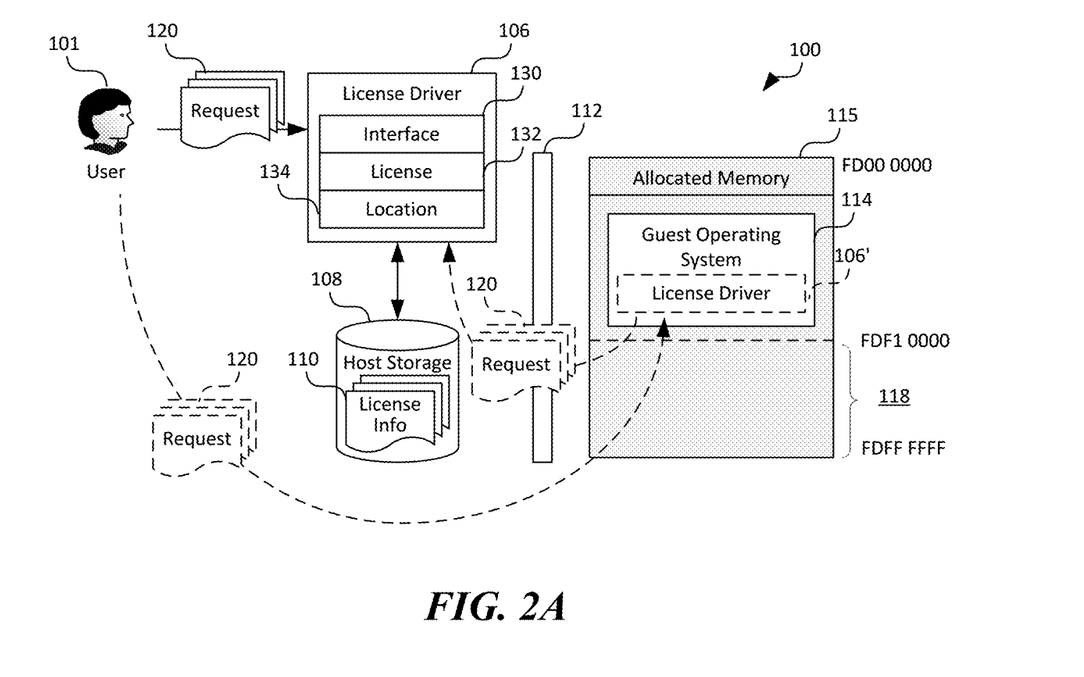
FIGS. 2A-2E are schematic diagrams of certain hardware/software components of the host of FIG. 1 during stages of operation in accordance with embodiments of the disclosed technology.

FIGS. 2A-2E are schematic diagrams of certain hardware/software components of the host 100 of FIG. 1 during stages of operation in accordance with embodiments of the disclosed technology. In FIG. 2A and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the host operating system 102 (FIG. 1) can allocate a range of virtual memory as allocated memory 115 to a guest operating system 114. In the illustrated example, the allocated memory 115 can include a block of memory between memory addresses "FD00 0000" and "FDFF FFFF." Within the allocated memory 115, the guest operating system 114 (e.g., operating system kernel) can occupy a portion of the allocated memory 115, such as from "FD00 0000" and "FDF1 0000." Another portion of the allocated memory 115, from "FDF1 0000" to "FDFF FFFF" is accessible to the guest operating system 114 but does not contain any data yet (referred to herein as "free memory 118"). Though not shown in FIG. 2A, the host operating system 102 and associated components, such as the license driver 106, can also have corresponding allocated memory (not shown) that is isolated from the allocated memory 115 to the guest operating system 114 by the security boundary 112.

Also shown in FIG. 2A, the license driver 106 can include an interface component 130, a license component 132, and a location component 134 operatively coupled to one another. Though the foregoing components are shown for illustration purposes, in other embodiments, the license driver 106 can also include additional and/or different components, modules, or routines. The interface module 130 can be configured to receive a user request 120 from the user 101 for launching an application 116 (FIG. 1) in the guest operating system 114. in certain examples, the user 101 can provide the user request 120 via a command line, graphical user interface, or other suitable interface elements (not shown). In other examples, the user request 120 can be provided by a script, a computing service, another software application, or other suitable types of entity. In further examples, the guest operating system 114 can also include an optional licensing driver 106' (or a licensing driver proxy, shown in phantom lines for clarity) that intercepts a user request 120' from the user 101 or an application 116 (FIG. 1) that is running in the guest operating system 114. The optional license driver 106' can then forward the intercepted user request 120' to the license driver 106 in the host operating system 102 for further processing. Upon receiving the user request 120 (or the user request 120' from the optional license driver 106'), the interface component 130 can indicate to the license component 132 to initiate license information sharing operations.

The license component 132 can be configured to check whether license information 110 corresponding to the requested application 116 exists in the host storage 108 upon receiving the indication of the received user request 120. In one embodiment, in response to determining that corresponding license information 110 does not exist in the host storage 108, the license component 132 can instruct the interface component 130 to provide a notification (not shown) to the user 101 indicating that launching the application 116 is not allowed. In other embodiments, in response to determining that corresponding license information 110 does not exist in the host storage 108, the license component 132 can instruct the interface component 130 to retrieve suitable licensing information 110 from, for instance, a remote server (not shown). In some embodiments, the application 116 may be launched with reduced capabilities, for example, missing key features, in demonstration mode, etc. In yet other embodiments, the license component 132 may prompt the user 101 to purchase the application 116 (or a valid license thereof) via the interface component 130. In further embodiments, the license component 132 can optionally be configured to enforce policies specified by the host operating system to, for example, restrict how many instances of the application 116 can be simultaneously launched in a guest operating system 114 running on the host operating system 102.

Figure 2B:
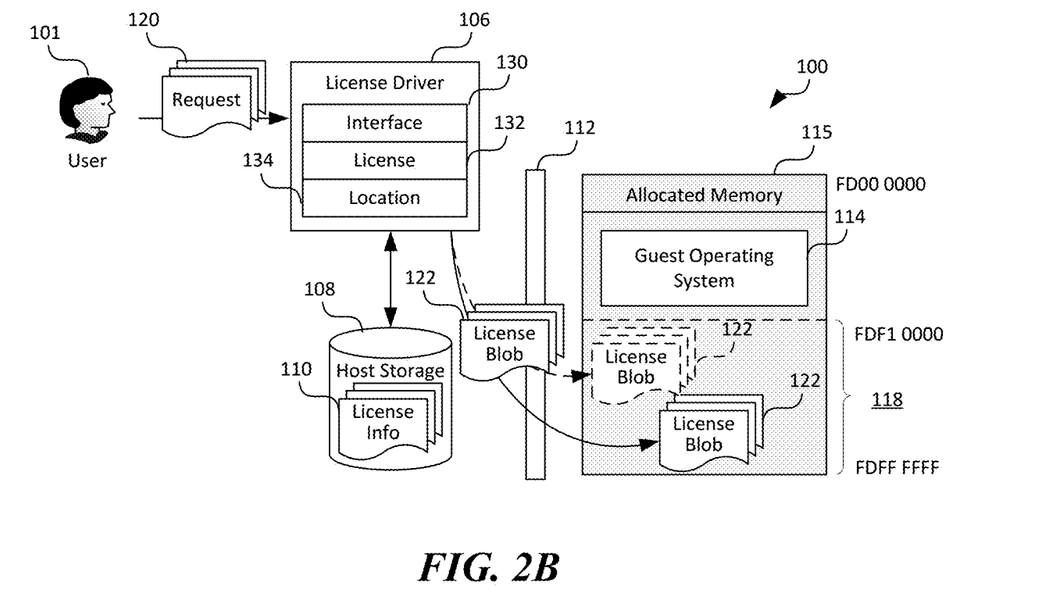

Upon retrieving the license information 110 or determining that the license information 110 already exists in the host storage 108, the license component 132 can be configured to generate a license blob 122 based on the license information 110 from the host storage 108, as shown in FIG. 2B. In one embodiment, generating the license blob 122 can include copying a product key from the license information 110. In other embodiments, generating the license blob 122 can also include setting a value of time-to-live or other suitable parameters on the copied product key. Upon expiration of the time-to-live value, the license blob 122 can be expired by, for example, deleting from a memory location in the allocated memory 115.

Upon generating the license blob 122, the license component 132 can instruct the location component 134 to determine a random memory location in the allocated memory 115 for storing the generated license blob 122. In one embodiment, the location component 134 can be configured to scan the allocated memory 115 to determine one or more memory ranges that contain free memory 118. In the illustrated example in FIG. 2B, the free memory 118 is from "FDF1 0000" to "FDFF FFFF." Upon determining the memory addresses of the free memory 118, the location component 134 can determine a random memory location in the free memory 118 by, for instance, utilizing a random number generator to generate a random offset from "FDF1 0000." In other embodiments, the location component 134 can determine the random memory location by generating a random offset from "FDFF FFF," or via other suitable techniques.

Figure 2C:
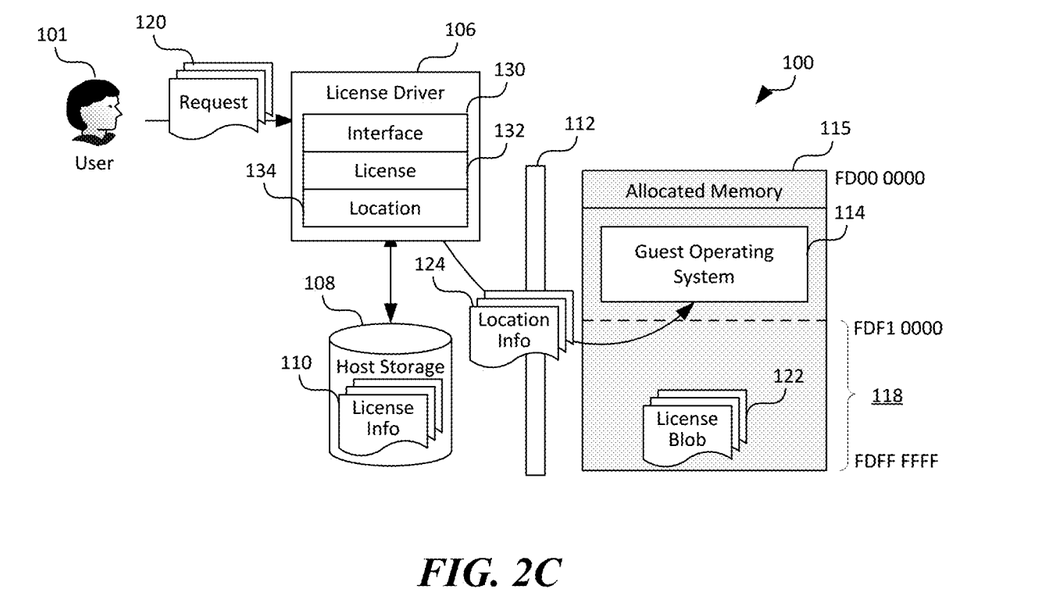
Figure 2D:
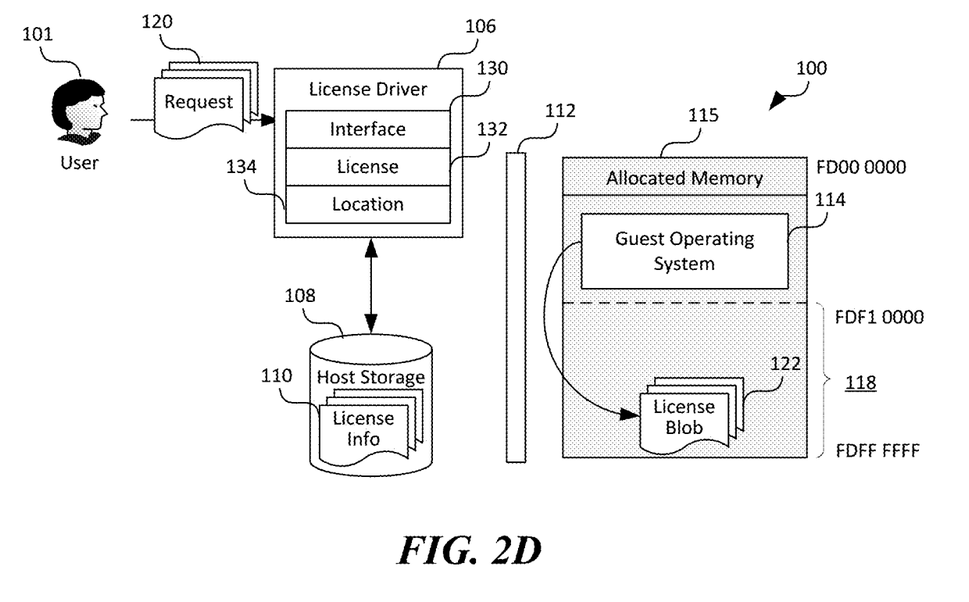

Once the random memory location is determined, the location component 134 can instruct the interface component 130 to write the license blob 122 to the determined random location in the free memory 118. Thus, as shown in FIG. 2B, the license blob 122 (one shown in phantom lines for clarity) can be stored at different memory locations in the free memory 118 based on the determined random memory location. As shown in FIG. 2C, the interface component 130 can also be configured to transmit a message (e.g., via inter-process messaging) to the guest operating system 114 regarding location information 124 corresponding to the stored license blob 122. As shown in FIG. 2D, using the received location information 124 (FIG. 2C), the guest operating system 114 can then query the license blob 122 at the determined random memory location to retrieve suitable application permissions or other suitable data. Based on the retrieved application permissions, the guest operating system 114 can then install, launch, or perform other suitable operations related to the application 116 (FIG. 1).

Figure 2E:
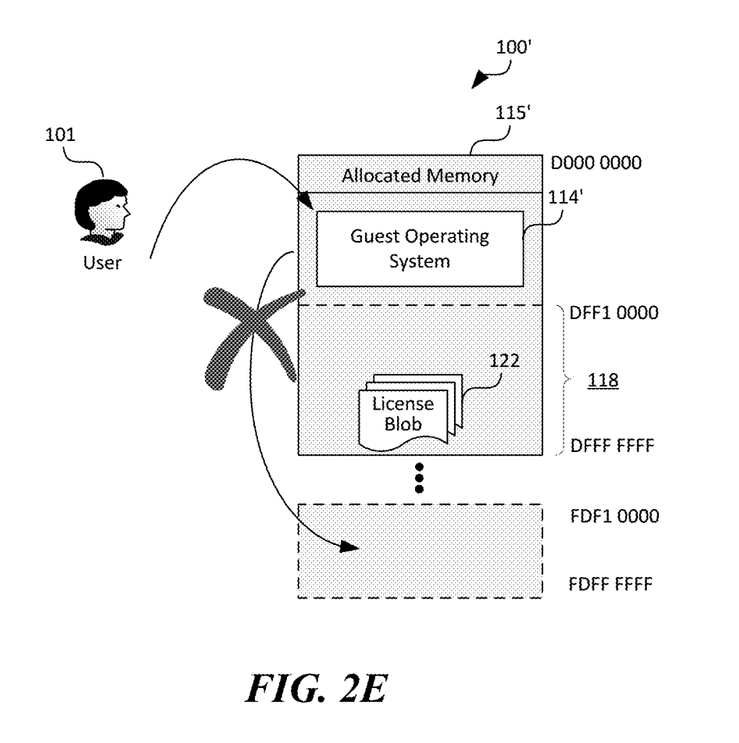

By storing the license blob 122 at random memory locations in the free memory 118, several embodiments of the disclosed technology can limit or even prevent software piracy when the user 101 pause and copy memory content of the guest operating system 114 to another host 100', as shown in FIG. 2E. For example, as shown in FIG. 2E, the user 101 can pause the guest operating system 114 on the host 100 and copy memory content, such as the license blob 122, to another host 100'.

The user 101 may then attempt to resume or re-launch the application 116 based on the license blob 122 in another guest operating system 114'. However, the host 100' would extremely unlikely to allocate the same virtual memory (shown as allocated memory 115') to the guest operating system 114' as that allocated to the guest operating system 114 on the initial host 100. For instance, in the illustrated example, the host 100' allocated a range of memory from "D000 0000" to "DFFF FFFF" to the guest operating system 114'. Thus, when the user 101 attempts to re-launch the application 116, the guest operating system 114' would attempt to query the license blob 122 at a memory location between "FDF1 0000" and "FDFF FFFF," which does not contain the license blob 122. As a result, the guest operating system 114' would fail to re-launch the application 116 because no license information appears to be available to the guest operating system 114'.

Several embodiments of the disclosed technology can thus provide a seamless experience with applications 116 while reducing or even preventing risks of software piracy. By allowing sharing of license information 110 between the host operating system 102 and a guest operating system 114, the user 101 is not required to have multiple license keys for each operating system. When sharing the license information 110, the license driver 106 can store the license blob 122 at a random memory location within the allocated memory 115. As such, even if memory content of the original guest operating system 114 is copied to another host 100', the new guest operating system 114' on the another host may not access the license blob 122 from the original host 100.

In additional embodiments, the host operating system 102 can employ the same or similar techniques illustrated in FIGS. 2A-2E, however, with the selected memory locations in the allocated memory 115 for storing the license blob 122 in a non-contiguous manner. The host operating system 102 can be configured to allocate the non-contiguous memory locations for storing the license blob 122 randomly or by using suitable types of patterns derived from a key or some other unique data sources. The license blob 122 can then be divided into smaller data packages or pieces and individually loaded into the non-contiguous memory regions. The host operating system 102 can then provide the selected memory locations as location information 124 to the guest operating system 112. Based on the location information 124, the guest operating system 112 can then collect the pieces of the license blob 122 from the non-contiguous memory locations and reassemble the pieces into a complete license blob 122 that is available in the guest operating system 112 for the user 101 or application 116. This foregoing technique of dividing and reassembling the license blob 122 can provide another layer of protection from piracy.

In certain embodiments, one license is used per application 116. In other embodiments, one or more applications 116 can be bundled to require a single license. In further embodiments, the application 116 may have "guest aware" licensing. In such embodiments, licenses for the host operating system 102 and multiple guest operating systems 114 may be pre-allocated or pre-generated and stored in the host storage 108. The license driver 106 can then selectively re-allocate these licenses to the guest operating systems 114. This technique can be useful in to facilitate operations of nested operating systems in which a first guest operating system 114 is also hosting a nested second guest operating system 114. In this scenario, the first guest operating system 114 can be configured to execute suitable instructions to provide its own license driver 106', which would receive one of the pre-allocated licenses to share with the nested second guest operating system (or additional guest operating systems 114).

Figure 3A:
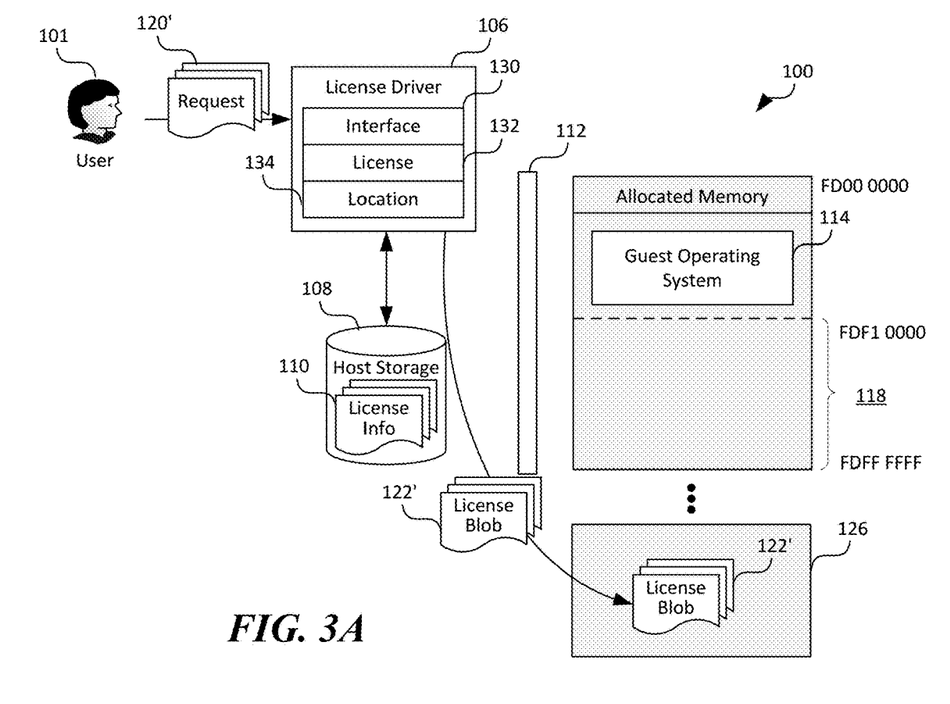
FIGS. 3A and 3B are schematic diagrams of certain hardware/software components of the host of FIG. 1 during additional stages of operation in accordance with embodiments of the disclosed technology.
Figure 3B:
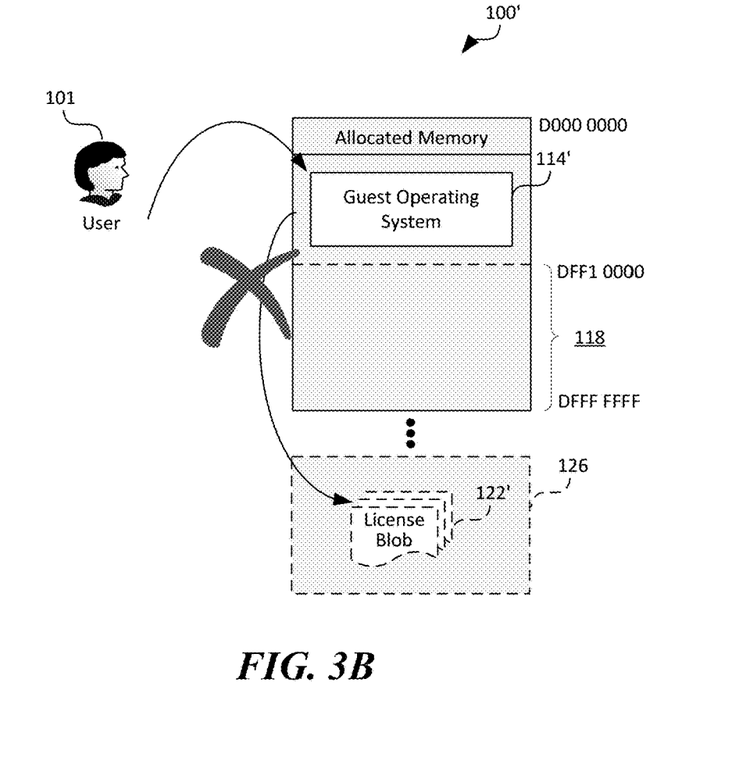

Even though FIGS. 2A-2E illustrate a technique of protecting the license blob 122 by randomly storing the license blob 122 in the allocated memory 115, in other embodiments, the license blob 122 can also be protected by storing the license blob 122 beyond the allocated memory 115. For example, as shown in FIG. 3A, the location component 134 of the license driver 106 can be configured to determine the range of the allocated memory 115 and then select a memory location that is beyond, or "out of bound" of the range of the allocated memory 115 in response to another user request 120'. As such, when the user 101 attempts to copy memory content of the guest operating system 114, the license bob 122' would not be copied to the another host 100', as shown in FIG. 3B. As a result, when the guest operating system 114' on the host 100' attempts to query the license blob 122', the query would fail because the license blob 122' (shown in phantom lines) does not exist on the host 100'. In other examples, the license blob 122' can also be stored in a virtual persistent memory or other suitable types of persistent memory or a removable storage medium (e.g., a USB drive) on the original host 100, a network file server, or a virtual hard drive temporarily mounted by the original guest operating system 114. Thus, even if memory content of the original guest operating system 114 is copied to the host 100', the license blob 122 would not be accessible by the guest operating system 114' on the host 100'.

Figure 4A:
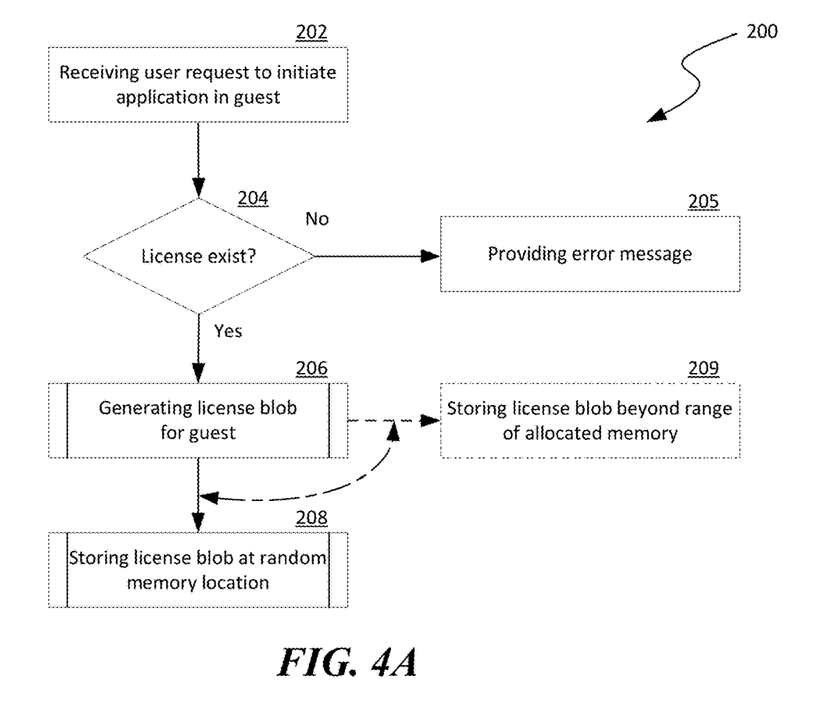
FIGS. 4A-4C are flowcharts illustrating certain processes of memory assignment for guest operating systems in accordance with embodiments of the disclosed technology.
Figure 4B:
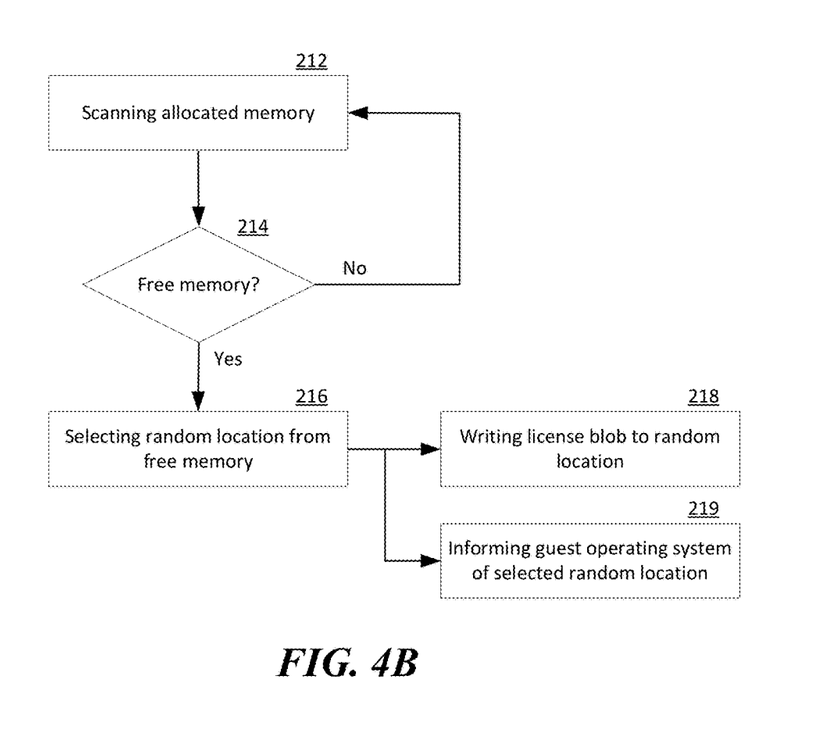
Figure 4C:
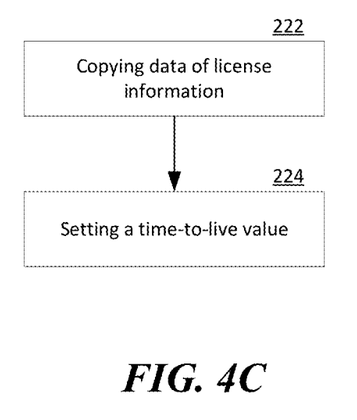

FIGS. 4A-4C are flowcharts illustrating certain processes of memory assignment for guest operating systems in accordance with embodiments of the disclosed technology. Even though embodiments of the processes are described below with reference to the host 100 of FIGS. 1-3B, in other embodiments, one or more of the processes may be implemented in a host with additional and/or different hardware/software components.

As shown in FIG. 4A, a process 200 includes receiving a user request from a user to initiate an application in a guest operating system at stage 202. In response to receiving the user request, the process 200 can include a decision stage 204 to determine whether license information corresponding to the application exists in or is accessible by a host operating system. In one implementation, data of the license information can be stored in a file system on a host and accessible to the host operating system. In another implementation, data of the license information can be stored on a remote server and accessible to the guest operating system via a computer network, such as the Internet.

In response to determining that the license information is not available, the process 200 can include providing an error message to the user at stage 205. Otherwise, the process 200 proceeds to generating a license blob for the guest operating system based on the available license information at stage 206. Example operations for generating the license blob 122 are described in more detail below with reference to FIG. 4C. Then, the process 200 can include storing the license blob beyond a range of allocated memory corresponding to the guest operating system at stage 209, or alternately, storing the license blob at a random memory location in the allocated memory. Example operations for storing the license blob at a random memory location in the allocated memory are described in more detail below with reference to FIG. 4B.

As shown in FIG. 4B, storing the license blob at a random memory location in the allocated memory can include scanning the allocated memory to the guest operating system at stage 212. The operations can then include a decision stage 214 to determine whether one or more ranges of the allocated memory is free. In response to determining that free memory does not exist in the allocated memory, the operations can revert to continue scanning the allocated memory at stage 212.

In response to determining that free memory exists in the allocated memory, the operations can then include selecting a random location from the free memory for storing the license blob at stage 216. The operations can then include writing the license blob to the selected random memory location at stage 218 and informing the guest operating system the random memory location at which the license blob is stored at stage 219.

FIG. 4C illustrate example operations for generating a license blob based on license information available to a host operating system. As shown in FIG. 4C, the operations can include copying data of the license information into a license blob. Example of such copied data can include a product key, a software key, an application performance level (e.g., regular versus professional), or other suitable information. The operations can also include setting a time-to-live value to the copied data at stage 224. The time-to-live value can be one, two, three, four, or any suitable number of days, after which the license blob would expire.

Figure 5:
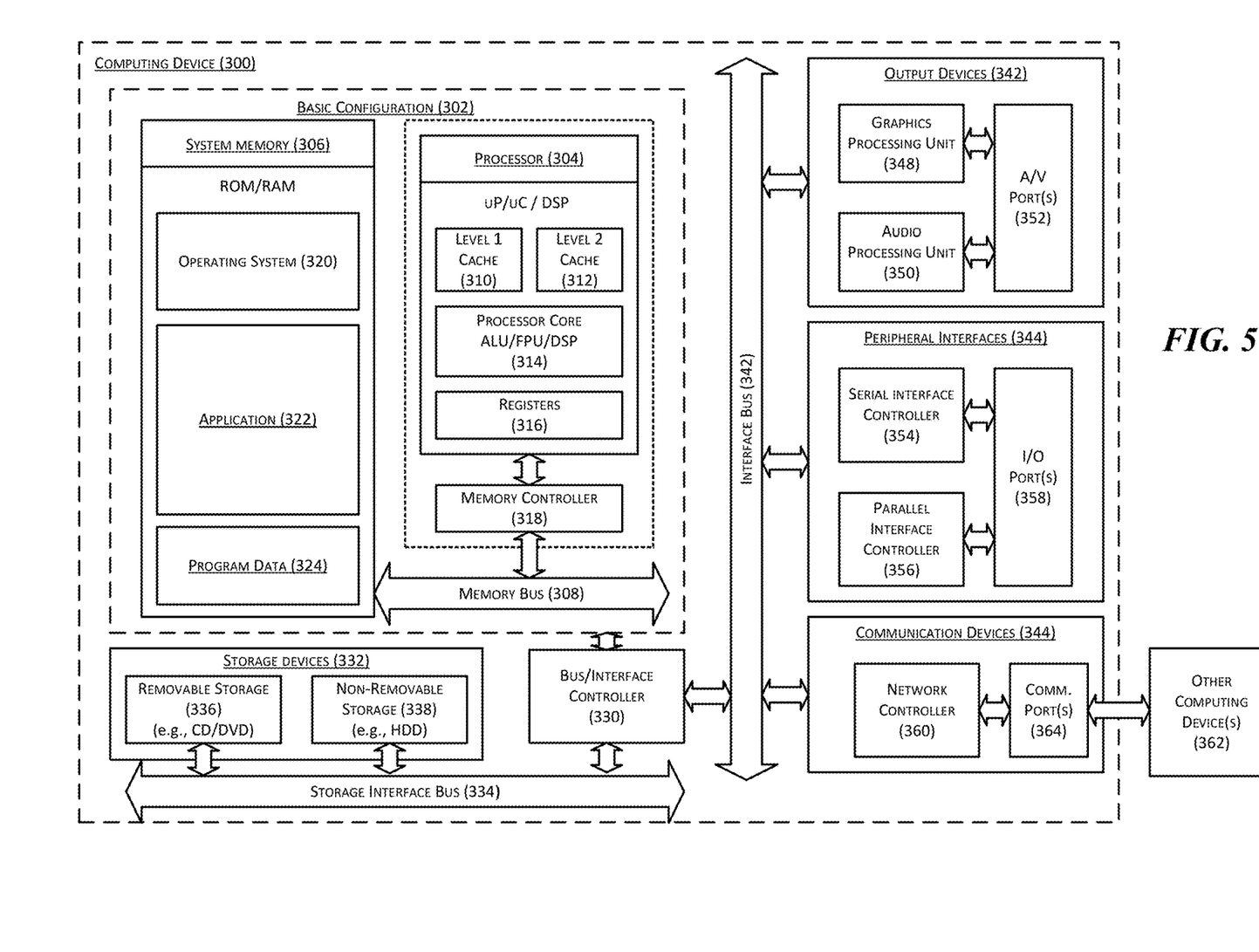
FIG. 5 is a computing device suitable for certain components of the computing device in FIG. 1.

FIG. 5 is a computing device 300 suitable for the host 100 in FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor ($\mu$P), a microcontroller ($\mu$C), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 10 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method for memory assignment for a guest operating system supported by a host operating system on a host computing device having a host storage holding records of license information, the method comprising:
   receiving a request to launch an application in the guest operating system having a range of allocated memory in the host computing device; and
   in response to receiving the request, at the host operating system,
      generating, based on a record of license information stored in the host storage, a license blob containing data representing a product key copied from the record of license information;
      determining a random memory location within a range of memory outside of the range of allocated memory to the guest operating system in the host computing device;
      writing the generated license blob from the host operating system to the determined random memory location within the range of memory outside of the range of allocated memory to the guest operating system; and
      communicating, from the host operating system to the guest operating system, the determined random memory location outside of the range of allocated memory to the guest operating system such that the guest operating system has access to the written license blob at the determined random memory location to launch the application, thereby preventing relaunching the application in a new guest operating system on a new host computing device using the same license blob when data in the range of memory allocated to the guest operating system on the host computing device is copied to a new range of memory that is allocated to the new guest operating system on the new host computing device.

2. The method of claim 1 wherein generating the license blob also includes one or more of setting a time-to-live value to the license blob or setting an event-based license value, and wherein upon expiration of the time-to-live value, the license blob stored in the random memory location expires, and further wherein the event-based license value indicates a license level according to a preset condition.

3. The method of claim 1, further comprising:
   in response to receiving the request, at the host operating system,
      determining whether the record of license information corresponding to the application exists in the host storage; and
      in response to determining that the record of license information corresponding to the application exists in the host storage, generating, based on the record of license information stored in the host storage, the license blob.

4. The method of claim 1, further comprising:
   in response to receiving the request, at the host operating system,
      determining whether the record of license information corresponding to the application exists in the host storage; and
      in response to determining that the record of license information corresponding to the application does not exist in the host storage,
         retrieving the record of license information from a remote server via a computer network; and
         generating, based on the retrieved record of license information, the license blob.

5. The method of claim 1 wherein determining the random memory location includes:
   scanning the range of memory not allocated by the host operating system to the guest operating system;
   determining one or more sub-ranges within the range of memory that do not contain any data; and
   randomly selecting a single memory location as the random memory location from the one or more sub-ranges.

6. The method of claim 1 wherein determining a random memory location within a range of memory includes:
   scanning the range of memory not allocated by the host operating system to the guest operating system;
   determining a sub-range within the range of memory that does not contain any data; and
   selecting multiple non-contiguous memory locations each having a corresponding random offset from a beginning memory location of the sub-range as the random memory location, and wherein writing the generated license blob includes writing multiple data packages of the license blob individually into one of the multiple non-contiguous memory locations.

7. The method of claim 1 wherein:
   the guest operating system is a first guest operating system hosting a second guest operating system;
   the license blob is a first license blob;
   the method further includes:
      generating, based on another record of license information pre-allocated and stored in the host storage, a second license blob;
      determining another random memory location outside of a range of memory allocated to the second guest operating system by the first guest operating system; and
      writing the second license blob to the determined another random memory location for access by the second guest operating system to launch another application.

8. The method of claim 1 wherein:
   the user request is a first request; and the method further includes:
receiving, a second request to launch another application in the guest operating system; and
in response to receiving the second request, at the host operating system,
generating, based on another record of license information stored in the host storage, another license blob containing data representing a product key copied from the another record of license information corresponding to the another application; and
writing the generated another license blob at another memory location beyond the range of memory allocated to the guest operating system by the host operating system on the host computing device, thereby preventing copying of the another license blob when data in the range of memory allocated to the guest operating system on the host computing device is copied to the new host computing device.

9. The method of claim 1 wherein:
the user request is a first request; and
the method further includes:
receiving, a second request to launch another application in the guest operating system; and
in response to receiving the second request, at the host operating system,
generating, based on another record of license information stored in the host storage, another license blob containing data representing a product key copied from the another record of license information corresponding to the another application; and
writing the generated another license blob in a virtual persistent memory of the host computing device, a removable storage medium of the host computing device, or a virtual hard drive temporarily mounted by the guest operating system, thereby preventing copying of the another license blob when data in the range of memory allocated to the guest operating system on the host computing device is copied to the new host computing device.

10. A computing device, comprising:
a processor; and
a memory containing instructions executable by the processor to cause the computing device to, upon receiving a request to launch an application in a guest operating system supported by a host operating system of the computing device:
generate, at the host operating system, a license blob containing data representing a product key copied from a record of license information;
select, by the host operating system, a random memory location within a range of virtual memory currently allocated to the guest operating system by the host operating system;
write the generated license blob generated by the host operating system to the selected random memory location; and
communicate, from the host operating system to the guest operating system, the selected random memory location at which the license blob is written such that the guest operating system has access to the license blob to launch the application, thereby preventing relaunching the application in another guest operating system on another computing device using the same license blob when data in the range of memory allocated to the guest operating system is copied to another range of memory that is allocated to the another guest operating system on the another computing device.

11. The computing device of claim 10 wherein the memory contains additional instructions executable by the processor to cause the computing device to:
determine whether the record of license information corresponding to the application exists in a host storage of the computing device; and
in response to determining that the record of license information corresponding to the application exists in the host storage, generate, based on the record of license information in the host storage, the license blob.

12. The computing device of claim 10 wherein the memory contains additional instructions executable by the processor to cause the computing device to:
determine whether the record of license information corresponding to the application exists in a host storage of the computing device; and
in response to determining that the record of license information corresponding to the application does not exist in the host storage,
retrieve the record of license information from a remote server via a computer network; and
generate, based on the retrieved record of license information, the license blob.

13. The computing device of claim 10 wherein to select the random memory location includes to:
scan the range of memory currently allocated to the guest operating system;
determine a sub-range within the range of memory that does not contain any data; and
randomly select, by the host operating system, a memory location as the random memory location from the sub-range of memory.

14. The computing device of claim 10 wherein to select the random memory location includes to:
scan the range of memory allocated to the guest operating system;
determine a sub-range within the range of memory that does not contain any data;
select multiple non-contiguous memory locations in the sub-range; and wherein to write the generated license blob includes to:
write multiple data packages of the license blob individually into one of the multiple non-contiguous memory locations;
notify the guest operating system of the non-contiguous memory locations, thereby allowing the guest operating system to collect the multiple data packages from the non-contiguous memory locations and reassemble the data packages into a complete license blob.

15. The computing device of claim 10 wherein the memory contains additional instructions executable by the processor to cause the computing device to:
receive, another request to launch another application in the guest operating system; and
in response to receiving the another request, at the host operating system,
generate, based on another record of license information, another license blob containing data representing a product key copied from the another record of license information corresponding to the another application; and store the generated another license blob at another memory location beyond the range of memory allocated to the guest operating system by the host operating system on the host computing device.

16. A method for memory assignment for a guest operating system supported by a host operating system on a host computing device having a host storage holding records of license information, the method comprising:
upon receiving, from a user, a request to launch an application in the guest operating system having a range of allocated memory in the host computing device,
generating, at the host operating system, a license blob containing data representing a product key copied from a record of license information in the host storage;
determining a random memory location within a range of memory outside of the range of allocated memory to the guest operating system in the host computing device;
storing the generated license blob in the determined random memory location;
communicating, from the host operating system to the guest operating system, the determined random memory location at which the license blob is stored such that the license blob is accessible by the guest operating system supported by the host operating system;
querying, by the guest operating system, the license blob for permission to launch the application; and
in response to obtaining the permission, launching the application in the guest operating system without having a separate product key for the guest operating system.

17. The method of claim 16 wherein generating the license blob also includes setting a time-to-live value to the license blob, and wherein upon expiration of the time-to-live value, the license blob stored in the random memory location expires.

18. The method of claim 16 wherein storing the generated license blob includes:
scanning the range of memory not allocated to the guest operating system;
determining a sub-range within the range of memory that does not contain any data; and
randomly selecting a memory location from the sub-range to store the license blob.

19. The method of claim 16 wherein:
the guest operating system is a first guest operating system hosting a second guest operating system;
the license blob is a first license blob;
the method further includes:
generating, based on another record of license information pre-allocated and stored in the host storage, a second license blob;
determining another random memory location outside of a range of memory allocated to the second guest operating system by the first guest operating system; and
writing the second license blob to the determined another random memory location for access by the second guest operating system to launch another application.

20. The method of claim 16 wherein:
the request is a first request; and
the method further includes:
receiving, a second request to launch another application in the guest operating system; and
in response to receiving the second request, at the host operating system,
generating, based on another record of license information stored in the host storage, another license blob containing data representing a product key copied from the another record of license information corresponding to the another application; and
writing the generated another license blob at another memory location beyond the range of memory allocated to the guest operating system by the host operating system on the host computing device, thereby preventing copying of the another license blob when data in the range of memory allocated to the guest operating system on the host computing device is copied to the new host computing device.

* * * * *